US012710933B2

(12) United States Patent
Liao et al.

(10) Patent No.: US 12,710,933 B2
(45) Date of Patent: Aug. 18, 2026

(54) OT DOMAIN LOW-CODE DEVELOPMENT METHOD AND PLATFORM, AND COMPUTER-READABLE MEDIUM

(71) Applicant: Siemens Aktiengesellschaft, Munich (DE)

(72) Inventors: Liang Liao, Beijing (CN); Zhen Hua Zhou, Shanghai (CN); Xiaoxun Zhu, Beijing (CN); Chang Wei Weng, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 242 days.

(21) Appl. No.: 18/697,511

(22) PCT Filed: Sep. 30, 2021

(86) PCT No.: PCT/CN2021/122421
§ 371 (c)(1),
(2) Date: Apr. 1, 2024

(87) PCT Pub. No.: WO2023/050408
PCT Pub. Date: Apr. 6, 2023

(65) Prior Publication Data
US 2024/0419408 A1 Dec. 19, 2024

(51) Int. Cl.
*G06F 8/34* (2018.01)

(52) U.S. Cl.
CPC .................................... *G06F 8/34* (2013.01)

(58) Field of Classification Search
CPC ........................................................ G06F 8/34
See application file for complete search history.

(56) References Cited

U.S. PATENT DOCUMENTS 11,567,737 B1 * 1/2023 Stump ................ G05B 19/0426
2017/0083386 A1 3/2017 Wing ........................ G06F 9/54
2021/0096827 A1 4/2021 Stump ...................... G06F 8/33

FOREIGN PATENT DOCUMENTS

CN 106 933 212 7/2017 ........... G05B 19/418
CN 108 681 444 10/2018 ............... G06F 8/20

OTHER PUBLICATIONS

Sanchis, Garcia-Perales, Fraile, and Poler, Low-Code as Enabler of Digital Transformation in Manufacturing Industry, Applied Sciences 2020, 10, 12, www.mdpi.com/journal/applsci (2020) (Year: 2020).*

(Continued)

*Primary Examiner* — Vance M Little
(74) *Attorney, Agent, or Firm* — Slayden Grubert Beard PLLC

(57) ABSTRACT

Some embodiments of the teachings herein include an OT domain low-code development platform. An example development tool receives an instruction inputted by a user on a GUI, to generate an OT domain workflow. The workflow is used to define an operation to be performed by a work unit in an OT domain. The tool determines, according to the instruction, functional blocks comprised in the OT domain workflow and relationships between the functional blocks. For each OT device in the work unit, an operation to be performed is defined by a functional block an instance of an operation template of a category to which the OT device belongs. The operation template predefines an operation which can be performed by the OT device of said category. The tool generates the OT domain workflow according to the determined functional blocks and relationships between the functional blocks.

7 Claims, 5 Drawing Sheets

(56) References Cited

OTHER PUBLICATIONS

Mehrabi, Ulsoy, and Koren, Reconfigurable Manufacturing Systems; Key to Future Manufacturing, Journal of Intelligent Manufacturing (2000) 11, 403-419, Kluwer Academic Publishers (2000) (Year: 2000).*

Search Report for International Application No. PCT/CN2021/122421, 13 pages.

* cited by examiner

OT DOMAIN LOW-CODE DEVELOPMENT METHOD AND PLATFORM, AND COMPUTER-READABLE MEDIUM

CROSS-REFERENCE TO RELATED APPLICATIONS

This application is a U.S. National Stage Application of International Application No. PCT/CN2021/122421 filed Sep. 30, 2021, which designates the United States of America, the contents of which are hereby incorporated by reference in their entirety.

TECHNICAL FIELD

The present disclosure relates to OT domain low-code development technology. Various embodiments of the teachings herein include OT domain low-code development methods and/or platforms.

BACKGROUND

At present, there are many IT low-code development tools or platforms on the market. Some of these tools or platforms are oriented toward experienced IT engineers in Internet of Things (IoT) use scenarios, while OT engineers and junior IT engineers struggle to understand their paradigms. Other tools or platforms are more suited to IT domain low-code development use scenarios, and cannot be effectively applied to the OT domain. Thus, there is an urgent need for a low-code development solution suitable for the OT domain.

SUMMARY

Teachings of the present disclosure enable OT domain low-code development methods and platforms. In operation, templates which can be performed by various OT devices are predefined, and by instantiating the templates as functional blocks and then combining these as an OT domain workflow, better suitability for OT domain code development may be attained. A graphical user interface may enable a user to input instructions, so as to generate the functional blocks, and finally form the OT domain workflow on the basis of relationships between the functional blocks, thus realizing low-code development.

As an example, some embodiments include an OT domain low-code development method performed by an OT domain low-code development platform. An OT domain low-code development tool in the platform receives an instruction inputted by a user on a graphical user interface, the instruction being used to generate an OT domain workflow; determines, according to the instruction, functional blocks comprised in the OT domain workflow and relationships between the functional blocks; and generates the OT domain workflow according to the determined functional blocks and relationships between the functional blocks. For each OT device in the work unit, an operation to be performed by the OT device is defined by a functional block, the functional block being an instance of an operation template of a category to which the OT device belongs, and the operation template predefining an operation which can be performed by the OT device of said category; and the OT domain workflow is used to define an operation to be performed by a work unit in an OT domain, wherein a main controller of the work unit is connected to OT devices in the work unit, so as to control the OT devices to complete the operation to be performed by the work unit according to the definition of the OT domain workflow.

As another example, some embodiments include an OT domain low-code development platform comprising constituent parts used to perform one or more of the methods described herein.

As another example, some embodiments include an OT domain low-code development platform comprising: at least one memory, configured to store computer-readable code; at least one processor, configured to call the computer-readable code, to perform one or more of the methods described herein.

As another example, some embodiments include a computer-readable medium is provided, storing computer-readable instructions which, when executed by a processor, cause the processor to perform one or more of the methods described herein.

As another example, some embodiments include a computer program product tangibly stored on a computer-readable medium and comprising computer-readable instructions which, when executed, cause at least one processor to perform one or more of the methods described herein.

In some embodiments, the OT domain low-code development tool further deploys the OT domain workflow onto a runtime of the main controller of the work unit, so that the OT devices in the work unit connected to the main controller perform operations according to the OT domain workflow. This achieves the objective of having the operation of the work unit controlled by the OT domain workflow.

In some embodiments, the OT domain low-code development platform further comprises an OT domain microservice generator, which generates a microservice on the basis of the OT domain workflow, so that an IT domain code development tool causes an IT device to call the microservice via a data platform, triggering the runtime of the main controller of the work unit to perform the OT domain workflow. Thus, by means of the data platform, the IT device can call the microservice generated on the basis of the OT domain workflow, thereby triggering execution of the OT workflow, and thus realizing fusion of an IT domain with the OT domain.

In some embodiments, the OT domain microservice generator or a third-party apparatus registers the microservice on the data platform, so that the IT domain code development tool causes an IT device to discover the connected microservice via the data platform. When the number of microservices is greater, registering the microservices on the data platform enables the IT device to discover the connected microservices, thus realizing calling of microservices by the IT device more effectively, and enhancing fusion of the OT domain with the IT domain.

In some embodiments, the OT domain microservice generator generates an API of the microservice on the basis of the OT domain workflow, wherein a processing process in the API comprises operations of the functional blocks in the OT domain workflow, an input parameter of the API is a parameter acquired by an input port of the OT domain workflow, and an output parameter of the API is a parameter outputted by an output port of the OT domain workflow. Here, a specific solution for generating the microservice on the basis of the OT domain workflow is provided, thus achieving automatic conversion of the OT domain workflow based on functional blocks, to the microservice.

In some embodiments, the operation template conforms to an information model that interacts with the runtime of the main controller. This achieves compatibility between the OT domain workflow and various main controllers, enabling the runtime of the main controller to correctly parse the operations which the OT domain workflow wishes to realize, thus achieving completion of the work unit operations.

LIST OF REFERENCE SIGNS

Figure 1:
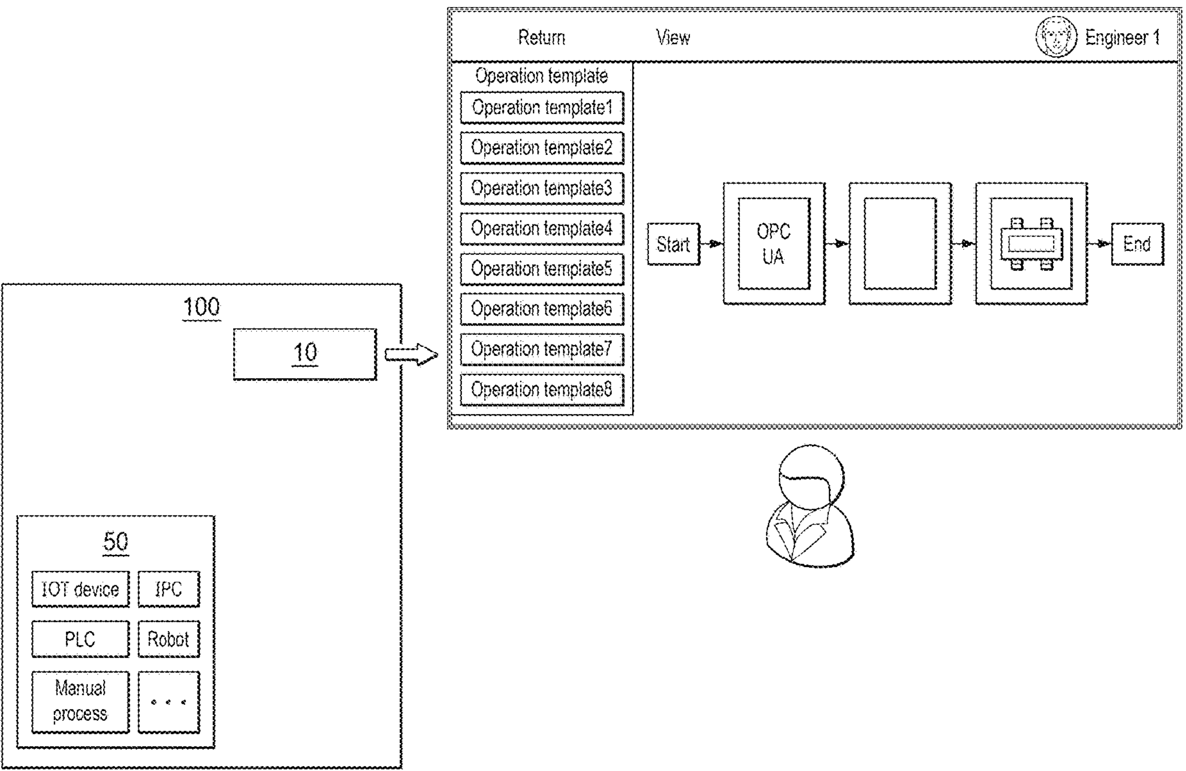
FIGS. 1-4 are schematic drawings of example OT domain low-code development platforms incorporating teachings of the present disclosure.

100: OT domain low-code development platform
10: OT domain low-code development tool
20: OT domain microservice generator
30: runtime on main controller of work unit
40: microservice 50: operation template
60: third-party apparatus
200: data platform
300: IT domain code development platform
301: IT domain code development tool
101: at least one memory
102: at least one processor
103: communication interface
11: OT domain low-code development program
500: OT domain low-code development method
S501-S506: steps of method 500

DETAILED DESCRIPTION

The teachings of the present disclosure are discussed herein with reference to exemplary embodiments. These embodiments are discussed purely in order to enable those skilled in the art to better understand and thus implement the subject matter described herein, without limiting the protection scope, applicability, or examples expounded in the claims. The functions and arrangement of the elements discussed can be changed without departing from the protection scope of the content of the embodiments of the present invention. Various processes or components can be omitted from, replaced in or added to each example as required. For example, the method described may be performed in a different order from that described, and all of the steps may be added, omitted or combined. In addition, features described in relation to some examples may also be combined in other examples.

As used herein, the term "comprises" and variants thereof denote open terms, meaning "including but not limited to". The term "based on" means "at least partly based on". The terms "one embodiment" and "an embodiment" mean "at least one embodiment". The term "another embodiment" means "at least one other embodiment". The terms "first", "second", etc. may denote different or identical objects. Other definitions may be included below, either explicit or implicit. Unless clearly indicated in the context, the definition of a term is the same throughout the specification.

FIG. 1 shows an example OT domain low-code development platform 100 incorporating teachings of the present disclosure, the platform 100 being used to realize low-code development in the OT domain. According to Gartner's definition, operational technology (OT) integrates hardware and software, and detects or triggers an event that occurs or a change in a process in an enterprise, by directly monitoring and/or controlling physical equipment (called OT equipment). OT uses computers to monitor or change a physical state of, for example, an industrial control system (ICS). An ICS is facilities, systems and equipment realized on the basis of computers, and used to remotely monitor and/or control key industrial processes, to realize physical functions. The word "OT" is intended to differentiate an ICS from a conventional information technology (IT) system with regard to technical implementation and function.

As stated above, at present, there is still no low-code development tool and platform suitable for the OT domain. In the platform 100 shown in FIG. 1, since operation templates 50 of operations which can be performed by various OT devices are predefined (which may be regarded as providing OT domain capability), functional blocks may be generated conveniently and quickly on the basis of the operation templates 50, and then combined as an OT domain workflow, thereby realizing low-code development suitable for the OT domain. A development engineer can realize OT domain development without in-depth understanding of the various OT devices. Here, OT devices may include but are not limited to: Internet of Things (IoT) devices, programmable logic controllers (PLC), robots (robotics), manual processes, industrial personal computers (IPC), etc.

Furthermore, the concept of "work unit" is proposed, so that development is closer to a relatively complete and independent control flow and operation, and more in keeping with the characteristics of industrial control, thus increasing the degree of integration of development, and reducing the complexity of development. Here, the work unit may be defined according to the actual industrial scenario, for example: one workstation on a production line corresponds to one work unit, etc., and different work units have different process flows.

Specifically, as shown in FIG. 1, the OT domain low-code development platform 100 may comprise an OT domain low-code development tool 10, wherein the OT domain low-code development tool 10 may be configured to:

- receive an instruction inputted by a user on a graphical user interface, the instruction being used to generate an OT domain workflow, the OT domain workflow being used to define an operation to be performed by a work unit in an OT domain, wherein a main controller of the work unit is connected to OT devices in the work unit, so as to control the OT devices to complete the operation to be performed by the work unit according to the definition of the OT domain workflow;
- determine, according to the instruction, functional blocks comprised in the OT domain workflow and relationships between the functional blocks, wherein, for each OT device in the work unit, an operation to be performed by the OT device is defined by a functional block, the functional block being an instance of an operation template 50 of a category to which the OT device belongs, and the operation template 50 predefining an operation which can be performed by the OT device of said category, and
- generate the OT domain workflow according to the determined functional blocks and relationships between the functional blocks.

The operation templates 50 of the operations which the various categories of OT devices can perform may be listed in the form of icons on the graphical user interface, and the user may determine the operations which the OT devices need to perform by selecting and dragging icons onto a canvas and may further set precise operations by setting specific parameters of the operations. The user selecting operation templates 50, dragging operation templates 50 and setting operation parameters, etc. may all be regarded as an instruction inputted by the user on the graphical user interface. After receiving the instruction, the OT domain low-code development tool 10 acquires information of the operation templates 50 according to the instruction and generates instances of the operation templates 50 (in the process of instantiation of the operation templates 50, the objective of precisely setting the OT device operations is achieved). Generally, there is more than one operation to be performed by a work unit, i.e. more than one operation defined in the OT domain workflow, so multiple functional blocks must generally be included; based on the order of the operations and relationships therebetween, the functional blocks comprised in the OT domain workflow and relationships between the functional blocks are determined, and the OT domain workflow is generated on this basis.

Figure 2:
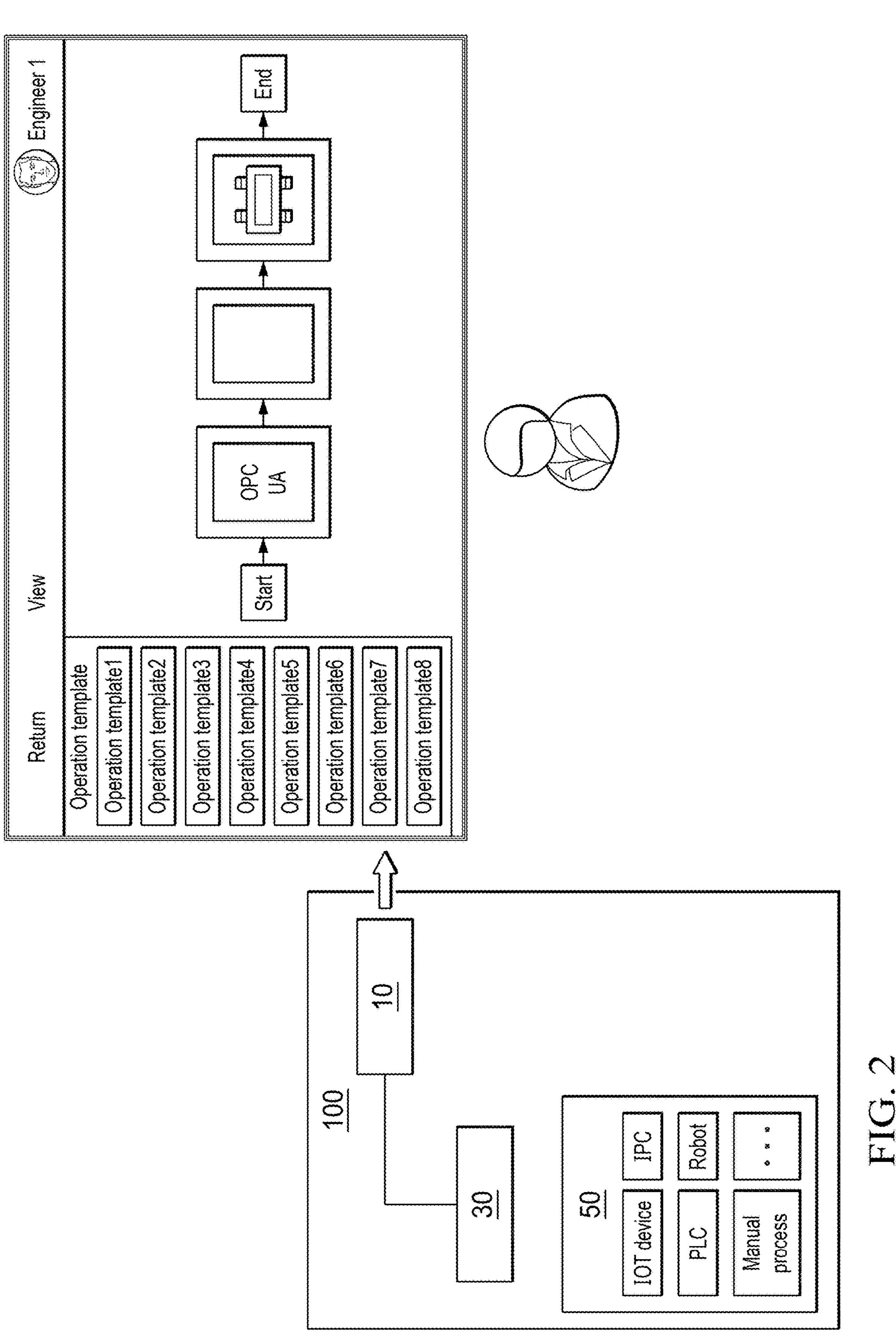

Furthermore, as shown in FIG. 2, the OT domain low-code development platform 100 may further comprise a runtime 30 of the main controller of the work unit mentioned above. The OT domain low-code development tool 10 may deploy the generated OT domain workflow onto the runtime 30 of the main controller of the work unit, so that the OT devices in the work unit connected to the main controller perform operations according to the OT domain workflow.

Figure 3:
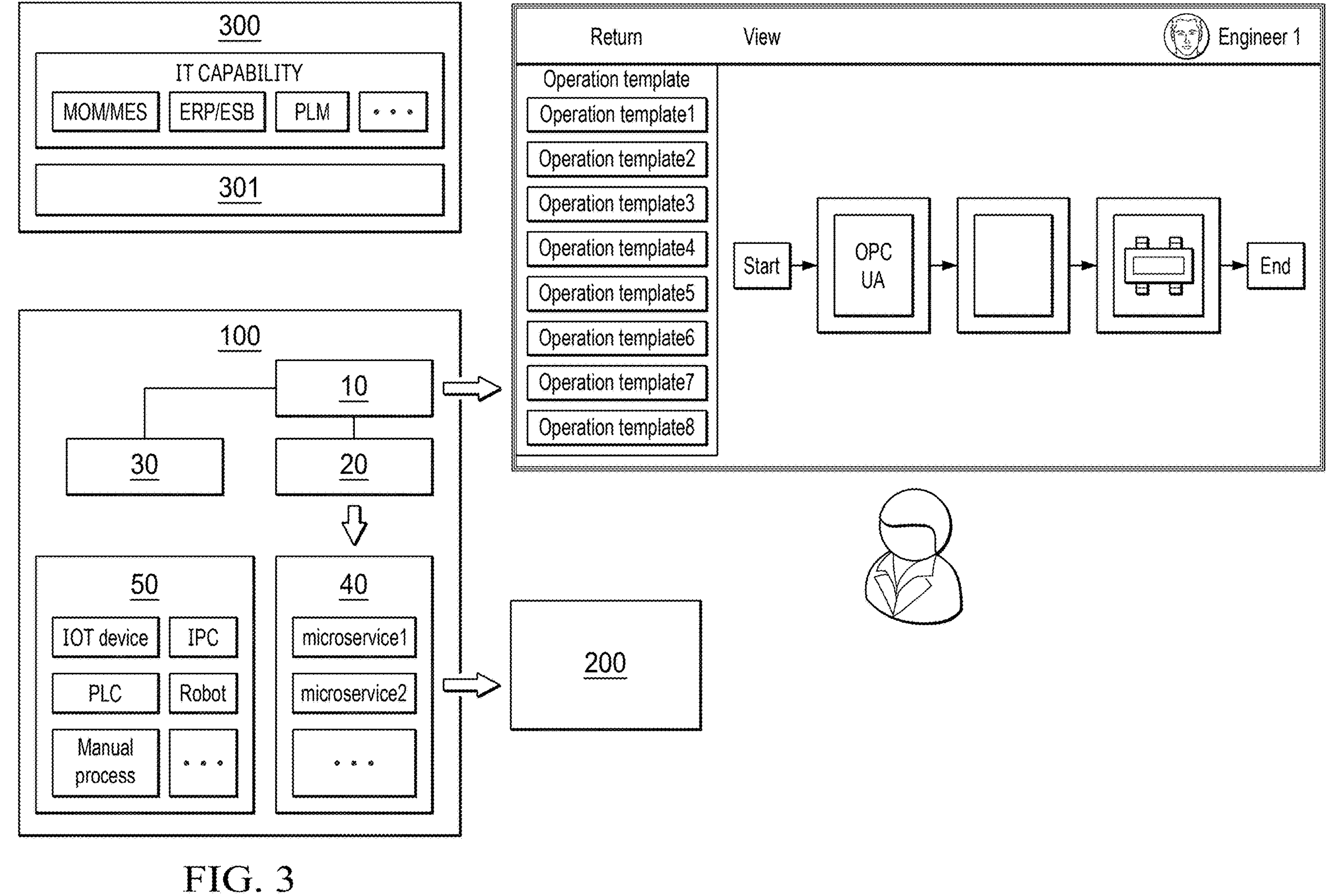

The composition of the OT domain low-code development platforms 100 shown in FIGS. 1 and 2 only relates to the OT domain. However, fusion of an IT domain with the OT domain has become increasingly important for the digital transformation of enterprises. What needs to be achieved is: how can an enterprise use an easy-to-understand and non-IT programming method to control OT domain flows. The OT domain low-code development platform 100 shown in FIG. 3 resolves the issue of how to control OT domain flows by means of an IT domain code development platform 300. As shown in FIG. 3, taking the structure shown in FIG. 2 as a starting point, the OT domain low-code development platform 100 may further comprise an OT domain microservice 20, generator which can generate microservices 40 on the basis of the OT domain workflow. Thus, an IT domain code development tool 301 can, by means of programming, cause an IT device to call a microservice 40 via a data platform 200, triggering the runtime 30 of the main controller of the work unit to perform the OT domain workflow. In this way, control of the OT domain flow by the IT domain code development platform 300 is achieved, i.e. fusion of the IT domain with the OT domain is achieved. Here, the microservice 40 is automatically generated by the OT domain microservice generator 20 on the basis of the OT domain workflow; the IT domain code development tool 301 need not understand the details of the OT domain workflow, and need only acquire an identifier (e.g. name) and an IP address of the microservice 40, and there is no need for IT domain developers to understand OT domain devices and controls flows, so implementation and understanding are easy. Here, IT devices may include but are not limited to: a manufacturing operation management (MOM) system, a manufacturing execution system (MES), an enterprise resource planning (ERP) system, an enterprise service bus (ESB), a product lifecycle management (PLM) system, etc.

In order to enable the IT domain to call the microservice 40, the IT domain needs to be able to acquire information of the microservice 40. Feasible methods include but are not limited to the following two:

Method One:

In method one, OT domain code developers can notify IT domain code developers of the names and IP addresses of the generated microservices 40, such that the IT domain code developers can write information of the microservices 40 into code directly in the process of development, thereby enabling IT devices to call microservices 40. Method one is more suited to scenarios in which the number of microservices is smaller.

Figure 4:
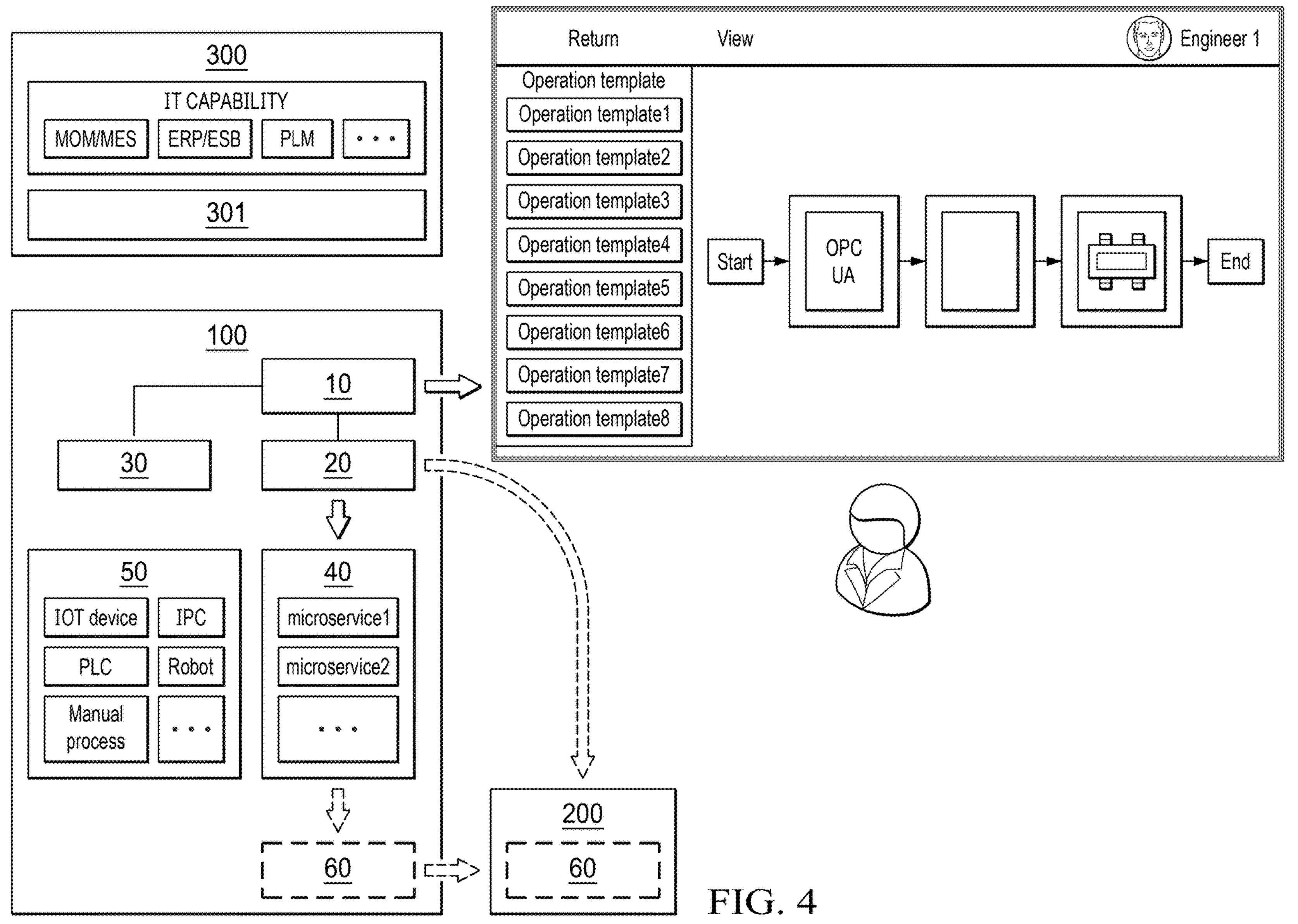

Method Two:

In method two, a registration and discovery mechanism may be used. The microservices 40 may be registered on the data platform 200, such that the IT domain code development tool 301 can, by means of code development, cause IT domain devices to discover connected microservices 40 via the data platform 200. An apparatus which performs registration of the microservices 40 may be the OT domain microservice generator 20 or a third-party apparatus 60 (as shown in FIG. 4). The third-party apparatus 60 may be regarded as part of the OT domain low-code development platform 100, or realized in the data platform 200. Method two is more suited to scenarios in which the number of microservices is greater.

In some embodiments, the OT domain microservice generator 20 may generate an API of the microservices 40 on the basis of the OT domain workflow, wherein a processing process in the API may comprise operations of the functional blocks in the OT domain workflow, input parameters of the API are parameters acquired by an input port of the OT domain workflow, and output parameters of the API are parameters outputted by an output port of the OT domain workflow.

In some embodiments, the operation template 50 conforms to an information model that interacts with the runtime 30 of the main controller. This achieves standardization of communication between the OT domain workflow and the main controllers of various kinds of OT devices.

Figure 5:
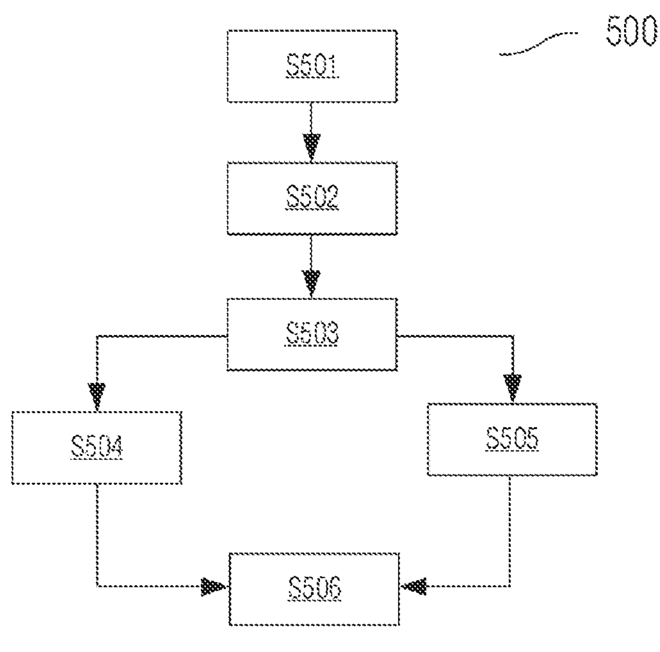
FIG. 5 is a flow chart of an example OT domain low-code development method incorporating teachings of the present disclosure.

FIG. 5 is a flow chart of an example OT domain low-code development method 500 incorporating teachings of the present disclosure; the method 500 may be realized by the OT domain low-code development platform 100, and may comprise:

S501: the OT domain low-code development tool 10 receiving an instruction inputted by a user on a graphical user interface, the instruction being used to generate an OT domain workflow, the OT domain workflow being used to define an operation to be performed by a work unit in an OT domain, wherein a main controller of the work unit is connected to OT devices in the work unit, so as to control the OT devices to complete the operation to be performed by the work unit according to the definition of the OT domain workflow;

S502: the OT domain low-code development tool 10 determining, according to the instruction, functional blocks comprised in the OT domain workflow and relationships between the functional blocks, wherein, for each OT device in the work unit, an operation to be performed by the OT device is defined by a functional block, the functional block being an instance of an operation template 50 of a category to which the OT device belongs, and the operation template 50 predefining an operation which can be performed by the OT device of said category;

S503: the OT domain low-code development tool 20 generating the OT domain workflow according to the determined functional blocks and relationships between the functional blocks.

S504: the OT domain low-code development tool 10 deploying the OT domain workflow onto the runtime 30 of the main controller of the work unit, so that the OT devices in the work unit connected to the main controller perform operations according to the OT domain workflow.

S505: the OT domain microservice generator 20 generating a microservice 40 on the basis of the OT domain workflow, so that the IT domain code development tool 301 causes an IT domain device to call the microservice 40 via a data platform 200, triggering the runtime 30 of the main controller of the work unit to perform the OT domain workflow. Specifically, the OT domain microservice generator 20 may generate an API of the microservice 40 on the basis of the OT domain workflow, wherein a processing process in the API comprises operations of the functional blocks in the OT domain workflow, input parameters of the API are parameters acquired by an input port of the OT domain workflow, and output parameters of the API are parameters outputted by an output port of the OT domain workflow.

S506: the OT domain microservice generator 20 or a third-party apparatus 60 registering the microservice 40 on the data platform 200, so that the IT domain code development tool 301 causes an IT domain device to discover the connected microservice 40 via the data platform 200.

Figure 6:
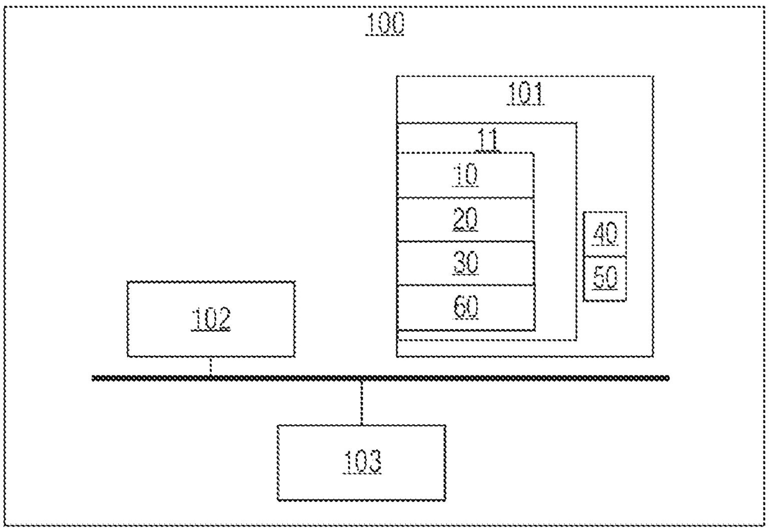
FIG. 6 is a schematic drawing of hardware implementation of an example OT domain low-code development platform incorporating teachings of the present disclosure.

FIG. 6 shows an example of hardware implementation of the example OT domain low-code development platform 100 incorporating teachings of the present invention. The OT domain low-code development tool 10, the OT domain microservice generator 20, the runtime 30 and the third-party apparatus 60 may all be realized as separate hardware devices, e.g. a server, a workstation, a microcontroller or a processing chip. In some embodiments, these apparatuses are realized on the same hardware device, being stored as software programs in at least one memory, and called by at least one processor to realize the OT domain low-code development method 500. The operation template 50 and the generated microservices 40 may be stored in at least one memory.

Specifically, as shown in FIG. 6, the OT domain low-code development platform 100 may comprise: at least one memory 101, which comprises a computer-readable medium, e.g. random access memory (RAM). At least one processor 102 coupled to the at least one memory 101 may also be included. Computer executable instructions are stored in the at least one memory 101, and, when executed by the at least one processor 102, can cause the at least one processor 102 to perform one or more of the methods described herein. Here, the at least one processor 102 may comprise a microprocessor, an application specific integrated circuit (ASIC), a digital signal processor (DSP), a central processing unit (CPU), a graphics processing unit (GPU), a state machine, etc.

Examples of computer readable media include, but are not limited to, floppy disks, CD-ROM, magnetic disks, memory chips, ROM, RAM, ASIC, configured processors, all-optical media, all magnetic tapes or other magnetic media, or any other media from which instructions can be read by a computer processor. In addition, various other forms of computer readable media may send or carry instructions to a computer, including a router, dedicated or public network, or other wired and wireless transmission devices or channels. The instructions may include code in any computer programming language, including C, C++, C language, Visual Basic, Java and JavaScript.

The at least one memory 101 shown In FIG. 3 may comprise a program 11 for generating an OT domain workflow, causing the at least one processor 102 to perform one or more of the OT domain low-code development methods described in the present disclosure. The OT domain low-code development program 11 may comprise the following program module: the OT domain low-code development tool 10, and optionally may further comprise the OT domain microservice generator 20, the runtime 30 and the third-party apparatus 60.

The OT domain low-code development tool 10 may be a lightweight web-based application program, which may be realized on an industrial site (e.g. edge device or local server) and may also be realized on a cloud (a public cloud such as AWS, or a private cloud such as OpenStack). A visual engineering paradigm thereof is derived from a function block type diagram (FBTD). The OT domain microservice generator 20 may use a modern translation programming language to generate a standard API such as RESTful or RPC. The runtime 30 may realize the OT domain workflow in a simple way, and provide openness based on an ecosystem of an open-source community (e.g. Python). The runtime 30 may be deployed on an embedded IoT device such as a single board computer (SBC).

In addition, the OT domain low-code development platform 100 may further comprise a communication interface 103, to realize communication with other devices, for example with the data platform 200. Some embodiments comprise an apparatus having an architecture different from that shown in FIG. 6. The architecture described above is merely exemplary and serves to explain the OT domain low-code development method 500.

In addition, a computer-readable medium may be stored on the computer-readable medium, and the computer-readable instruction, when executed by a processor, causes the processor to perform one or more of the OT domain low-code development methods described herein. Examples of computer-readable media include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards, and ROM. In some embodiments, a computer-readable instruction may be downloaded from a server computer or a cloud through a communication network.

Not all of the steps and modules in the flows and system structure diagrams above are necessary; certain steps or modules may be omitted according to actual requirements. The sequence in which the steps are executed is not fixed and may be adjusted as needed. The system structures described in the embodiments above may be physical structures or logical structures, some modules might be realized by the same physical entity, or some modules might be realized by a plurality of physical entities or realized jointly by certain components in a plurality of independent devices.

What is claimed is:

1. An OT domain low-code development platform comprising;

an OT domain low-code development tool configured to:

receive an instruction from a user on a graphical user interface;

use the instruction to generate an OT domain workflow;

use the OT domain workflow to define an operation to be performed by a work unit in an OT domain;

wherein a main controller of the work unit is connected to OT devices in the work unit to control the OT devices to complete the operation to be performed by the work unit according to the definition of the OT domain workflow;

determine, based on the instruction, functional blocks in the OT domain workflow and relationships between the functional blocks, wherein, for each OT device in the work unit, an operation to be performed by the OT device is defined by a functional block, the functional block being an instance of an operation template of a category to which the OT device belongs, wherein the operation template predefines an operation which can be performed by the OT device of said category;

generate the OT domain workflow according to the determined functional blocks and relationships between the functional blocks; and deploy the OT domain workflow onto a runtime of the main controller of the work unit, so that the OT devices in the work unit connected to the main controller perform operations according to the OT domain workflow; and an OT domain microservice generator configured to generate a microservice on the basis of the OT domain workflow, so that an IT domain code development tool causes an IT device to call the microservice via a data platform, triggering the runtime of the main controller of the work unit to perform the OT domain workflow;

wherein the OT domain microservice generator, when generating a microservice on the basis of the OT domain workflow, is configured to generate an API of the microservice on the basis of the OT domain workflow, wherein a processing process in the API comprises operations of the functional blocks in the OT domain workflow, an input parameter of the API is a parameter acquired by an input port of the OT domain workflow, and an output parameter of the API is a parameter outputted by an output port of the OT domain workflow.

2. The platform as claimed in claim 1, wherein: the OT domain microservice generator is further configured to register the microservice on the data platform, so that the IT domain code development tool causes an IT device to discover the connected microservice via the data platform; or the platform further comprises a third-party apparatus configured to register the microservice on the data platform, so that the IT domain code development tool causes an IT device to discover the connected microservice via the data platform.

3. The platform as claimed in claim 1, wherein the operation template conforms to an information model that interacts with the runtime of the main controller.

4. An OT domain low-code development method comprising:

receiving an instruction from a user on a graphical user interface with an OT domain low- code development tool;

using the instruction to generate an OT domain workflow;

using the OT domain workflow to define an operation to be performed by a work unit in an OT domain;

wherein a main controller of the work unit is connected to OT devices in the work unit, so as to control the OT devices to complete the operation to be performed by the work unit according to the definition of the OT domain workflow;

determining, according to the instruction, functional blocks comprised in the OT domain workflow and relationships between the functional blocks, wherein, for each OT device in the work unit, an operation to be performed by the OT device is defined by a functional block, the functional block being an instance of an operation template of a category to which the OT device belongs, and the operation template predefining an operation which can be performed by the OT device of said category;

generating the OT domain workflow with the OT domain low-code development tool according to the determined functional blocks and relationships between the functional blocks;

after generating the OT domain workflow, the OT domain low-code development tool deploying the OT domain workflow onto a runtime of the main controller of the work unit, so that the OT devices in the work unit connected to the main controller perform operations according to the OT domain workflow;

after generating the OT domain workflow, generating a microservice on the basis of the OT domain workflow, so that an IT domain code development tool causes an IT device to call the microservice via a data platform, triggering the runtime of the main controller of the work unit to perform the OT domain workflow;

wherein generating a microservice on the basis of the OT domain workflow comprises the OT domain microservice generator generating an API of the microservice on the basis of the OT domain workflow; and a processing process in the API comprises operations of the functional blocks in the OT domain workflow, an input parameter of the API is a parameter acquired by an input port of the OT domain workflow, and an output parameter of the API is a parameter outputted by an output port of the OT domain workflow.

5. The method as claimed in claim 4, further comprising, after the OT domain microservice generator generates a microservice on the basis of the OT domain workflow, the OT domain microservice generator or a third-party apparatus registering the microservice on the data platform, so that the IT domain code development tool causes an IT device to discover the connected microservice via the data platform.

6. The method as claimed in claim 4, wherein the operation template conforms to an information model that interacts with the runtime of the main controller.

7. An OT domain low-code development platform comprising:

at least one memory storing computer-readable code;

at least one processor configured to call the computer-readable code, to:

receive an instruction from a user on a graphical user interface with an OT domain low- code development tool;

use the instruction to generate an OT domain workflow;

use the OT domain workflow to define an operation to be performed by a work unit in an OT domain;

wherein a main controller of the work unit is connected to OT devices in the work unit, so as to control the OT devices to complete the operation to be performed by the work unit according to the definition of the OT domain workflow;

determine, according to the instruction, functional blocks comprised in the OT domain workflow and relationships between the functional blocks, wherein, for each OT device in the work unit, an operation to be performed by the OT device is defined by a functional block, the functional block being an instance of an operation template of a category to which the OT device belongs, and the operation template predefining an operation which can be performed by the OT device of said category;

generate the OT domain workflow with the OT domain low-code development tool according to the determined functional blocks and relationships between the functional blocks;

deploy the OT domain workflow onto a runtime of the main controller of the work unit, so that the OT devices in the work unit connected to the main controller perform operations according to the OT domain workflow; and generate a microservice on the basis of the OT domain workflow, so that an IT domain code development tool causes an IT device to call the microservice via a data platform, triggering the runtime of the main controller of the work unit to perform the OT domain workflow;

wherein the OT domain microservice generator, when generating a microservice on the basis of the OT domain workflow, is configured to generate an API of the microservice on the basis of the OT domain workflow, wherein a processing process in the API comprises operations of the functional blocks in the OT domain workflow, an input parameter of the API is a parameter acquired by an input port of the OT domain workflow, and an output parameter of the API is a parameter outputted by an output port of the OT domain workflow.

* * * * *